(12) United States Patent
Liu et al.

(10) Patent No.: US 11,086,038 B2
(45) Date of Patent: Aug. 10, 2021

(54) SEISMIC NOISE ATTENUATION USING ADAPTIVE SUBTRACTION WITH IMPROVED NOISE ESTIMATION

(71) Applicant: PGS Geophysical AS, Oslo (NO)

(72) Inventors: Yan-Qiang Liu, Surbiton (GB); Paul Lecocq, London (GB); Luca Marsiglio, Watford (GB)

(73) Assignee: PGS Geophysical AS, Oslo (NO)

( * ) Notice: Subject to any disclaimer, the term of this patent is extended or adjusted under 35 U.S.C. 154(b) by 413 days.

(21) Appl. No.: 16/165,334

(22) Filed: Oct. 19, 2018

(65) Prior Publication Data
US 2019/0120985 A1 Apr. 25, 2019

Related U.S. Application Data

(60) Provisional application No. 62/574,949, filed on Oct. 20, 2017.

(51) Int. Cl.
*G01V 1/28* (2006.01)
*G01V 1/32* (2006.01)
*G01V 1/36* (2006.01)
*G01V 3/38* (2006.01)

(52) U.S. Cl.
CPC .............. *G01V 1/362* (2013.01); *G01V 1/282* (2013.01); *G01V 1/32* (2013.01); *G01V 1/364* (2013.01); *G01V 3/38* (2013.01)

(58) Field of Classification Search
CPC .......... G01V 1/362; G01V 1/364; G01V 3/38; G01V 1/282; G01V 1/32
See application file for complete search history.

(56) References Cited

U.S. PATENT DOCUMENTS

| | | |
|---|---|---|
| 6,735,527 B1 | 5/2004 | Levin |
| 7,646,924 B2 | 1/2010 | Donoho |
| 7,840,625 B2 | 11/2010 | Candes et al. |
| 7,881,501 B2 | 2/2011 | Pinnegar et al. |
| 8,213,260 B2 | 7/2012 | Nichols |
| 8,279,707 B2 | 10/2012 | Hennenfent |
| 8,280,695 B2 | 10/2012 | Neelamani et al. |
| 8,352,190 B2 | 1/2013 | Baumstein et al. |

(Continued)

OTHER PUBLICATIONS

Emmanuel Candes, et al., "Fast Discrete Curvelet Transforms," Applied and Computational Mathematics, Caltech, Pasadena, CA; Department of Statistics, Stanford University, Stanford, CA, Jul. 2005, revised Mar. 2006, 44 pages.

(Continued)

*Primary Examiner* — Daniel Pihulic

(57) ABSTRACT

Techniques are disclosed relating to reducing noise in geophysical marine survey data. Such techniques may include adapting an initial set of noise templates to recorded seismic data to generate adapted noise templates and estimating a noise component in the recorded seismic data. The estimating may include determining a degree to which noise and signal components are correlated in the recorded seismic data and masking the recorded seismic data proportionally to the degree of correlation. The adapted noise templates may then be further adapted to a difference between the estimate of the noise component and the noise templates themselves. Resultant noise templates may then be applied to denoise the recorded seismic data.

25 Claims, 10 Drawing Sheets

(56) References Cited

U.S. PATENT DOCUMENTS

| | | | |
|---|---|---|---|
| 8,538,702 | B2 | 9/2013 | Neelamani et al. |
| 3,588,028 | A1 | 11/2013 | Nichols et al. |
| 9,075,162 | B2 | 7/2015 | Baardman et al. |
| 9,146,329 | B2 | 9/2015 | Houck et al. |
| 9,151,856 | B2 | 10/2015 | Beasley et al. |
| 2010/0211320 | A1 | 8/2010 | Vassallo et al. |
| 2011/0213556 | A1 | 9/2011 | Yu et al. |
| 2012/0041682 | A1 | 2/2012 | Ramirez-Perez et al. |
| 2012/0275267 | A1 | 11/2012 | Neelamani et al. |
| 2013/0003500 | A1 | 1/2013 | Neelamani et al. |
| 2013/0100771 | A1 | 4/2013 | Diallo et al. |
| 2013/0182533 | A1 | 7/2013 | Rentsch-Smith |
| 2013/0253838 | A1 | 9/2013 | Tegtmeier-Last et al. |
| 2014/0019055 | A1 | 1/2014 | Kustowski et al. |
| 2014/0043936 | A1 | 2/2014 | Poole |
| 2014/0188395 | A1 | 7/2014 | Poole et al. |
| 2014/0200818 | A1 | 7/2014 | Peng et al. |
| 2014/0200819 | A1 | 7/2014 | Wu |
| 2014/0269185 | A1 | 9/2014 | Ferber et al. |
| 2014/0269186 | A1 | 9/2014 | Tegtmeier-Last et al. |
| 2014/0278118 | A1 | 9/2014 | Tegtmeier-Last et al. |
| 2014/0288891 | A1 | 9/2014 | Pica et al. |
| 2014/0365135 | A1 | 12/2014 | Poole |
| 2015/0006085 | A1 | 1/2015 | Bisley et al. |
| 2015/0023608 | A1 | 1/2015 | Donoho |
| 2015/0117151 | A1 | 4/2015 | Curry et al. |
| 2015/0120199 | A1 | 4/2015 | Casey |
| 2015/0212222 | A1 | 7/2015 | Poole |
| 2015/0236668 | A1 | 8/2015 | Poole et al. |
| 2015/0338538 | A1 | 11/2015 | Liu et al. |
| 2016/0109597 | A1 | 4/2016 | Hoeber et al. |
| 2019/0120985 | A1* | 4/2019 | Liu .................. G01V 1/362 |

OTHER PUBLICATIONS

Felix J. Herrmann, et al. "Curvelet-domain multiple elimination with sparseness constraints," SEG Int'l Exposition and 74th Annual Meeting, Denver, CO, Oct. 10-15, 2004, 4 pages.

Michael Jervis, et al., "Edge preserving filtering on 3-D seismic data using complex wavelet transforms," SEG/New Orleans 2006 Annual Meeting, 5 pages.

Ramesh (Neelsh) Neelamani, et al., "Adaptive subtraction using complex-valued curvelet transforms," Geophysics, vol. 75, No. 4, Jul.-Aug. 2010, p. V51-V60, 13 FIGS, 10 pages.

Sergi Ventosa, et al., "Unary adaptive subtraction of joint multiple models with complex wavelet frames," SEG Las Vegas 2012 Annual Meeting, 5 pages.

Sergi Ventosa, et al., "Adaptive multiple subtraction with wavelet-based complex unary Wiener filters," Geophysics, vol. 77, No. 6 (Nov.-Dec. 2012); p. V183-V192, 10 FIGS, 10 pages.

Margaret Yu, et al., "Flexible surface multiple attenuation using the curvelet transform," SEG San Antonio 2011 Annual Meeting, 5 pages.

Shoudong Huo, et al., "Improving adaptive subtraction in seismic multiple attenuation," Geophysics, vol. 74, No. 4, Jul.-Aug. 2009, p. V59-V67, 5 FIGS.

M. S. Oliveira, et al., "Seismic denoising using curvelet analysis," Elsevier B.V., Physica A 391, 2012, pp. 2106-2110.

Neelamani, et al., "Coherent and random noise attenuation using the curvelet transform," The Leading Edge, Feb. 2008, pp. 240-248.

Neelamani, et al., "Adaptive subtraction using complex-valued curvelet transforms," Geophysics, vol. 75, No. 4, Jul.-Aug. 2010; pp. V51-V60.

Perrier, et al., "Intelligent Adaptive Subtraction for Multiple Attenuation," 79th EAGE Conference & Exhibition 2017 Paris Jun. 12-15, 2017, 5 pages.

Nguyen, et al., "Adaptive multiple subtraction by statistical curvelet matching," SEG International Exposition and 86th Annual Meeting, 2016, pp. 4566-4571.

Nguyen, et al., "Uniform Discrete Curvelet Transform," submitted for publication in IEEE Transaction on Signal Processing, Oct. 2009, 18 pages.

\* cited by examiner

SEISMIC NOISE ATTENUATION USING ADAPTIVE SUBTRACTION WITH IMPROVED NOISE ESTIMATION

CROSS-REFERENCE TO RELATED APPLICATIONS

This application claims priority to U.S. Provisional Patent Application No. 62/574,949, filed on Oct. 20, 2017, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

During the course of a geophysical survey, the various sensors may collect data indicative of geological structures, which may be analyzed, e.g., to determine the possible locations of hydrocarbon deposits. However, the data may be contaminated by various sources of noise that may complicate the data analysis. Removing such noise presents a perennial problem in geophysical imaging as well as other imaging contexts. Embodiments of this disclosure may be used to address some of the challenges of noise reduction, as discussed below.

DETAILED DESCRIPTION

Figure 1:
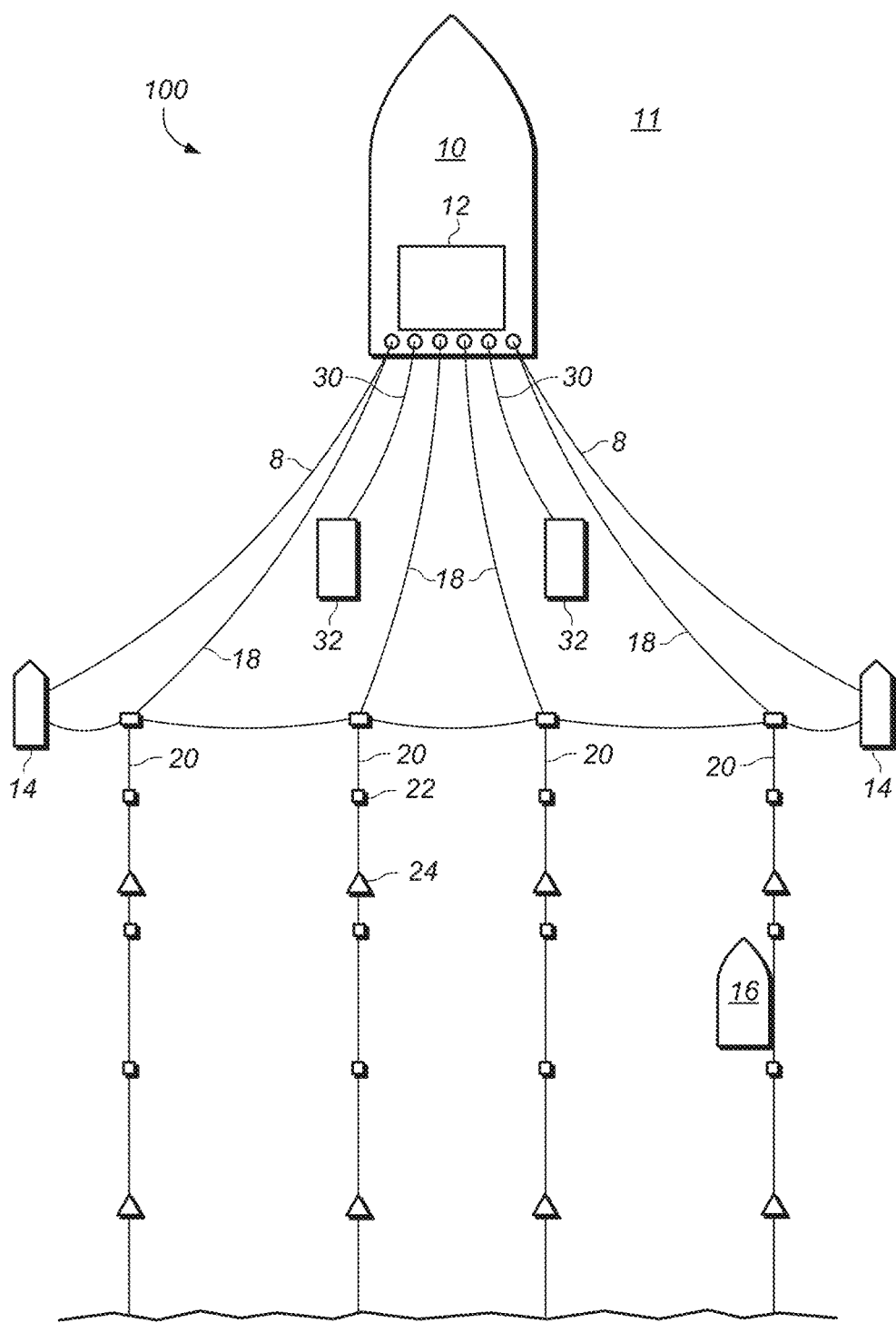
FIG. 1 shows an embodiment of a marine geophysical survey system.

This disclosure initially describes, with reference to FIG. 1, an overview of a geophysical survey system. It then describes examples of improved adaptive subtraction techniques for noise reduction with reference to FIGS. 2-6. Data visualizations that contrast the improved techniques with conventional techniques are discussed with respect to FIGS. 7-9. Finally, an example computing system is described with reference to FIG. 10.

Survey Overview

Referring to FIG. 1, an illustration of an embodiment of a geophysical survey system 100 is shown (not necessarily to scale). System 100 includes survey vessel 10 (also referred to as a "first vessel"), signal sources 32, source cables 30, paravanes 14, and streamers 20. (Streamers 20 are shown truncated at the bottom of FIG. 1.) Survey vessel 10 may be configured to move along a surface of body of water 11 such as a lake or ocean. In the illustrated embodiment, survey vessel 10 tows streamers 20, signal sources 32, and paravanes 14, which may be used to provide a desired amount of spread among streamers 20. In other embodiments, streamers 20 may be towed by a separate vessel (not shown), rather than survey vessel 10 that tows signal sources 32.

Streamers 20 may include sensors 22 (e.g., hydrophones, geophones, electromagnetic sensors, etc.). Streamers 20 may further include streamer steering devices 24 (also referred to as "birds") which may provide selected lateral and/or vertical forces to streamers 20 as they are towed through the water, typically based on wings or hydrofoils that provide hydrodynamic lift. Streamers 20 may further include tail buoys (not shown) at their respective back ends. System 100 further includes chase vessel 16 (also referred to as a "second vessel"), which may be used to maintain (e.g., clean, service, or repair) selected elements of system 100 (e.g., streamers 20) as needed. For example, sections of a streamer 20 may be replaced, or auxiliary equipment may be replaced. For example, chase vessel 16 may include devices (discussed in more detail below) to allow streamers 20 to be lifted out of the water as desired.

Survey vessel 10 may include equipment, shown generally at 12 and for convenience collectively referred to as a "recording system." Recording system 12 may include devices such as a data recording unit (not shown separately) for making a record with respect to time of signals generated by various geophysical sensors. Recording system 12 may also include navigation equipment (not shown separately), which may be configured to control, determine, and record, at selected times, the geodetic positions of: survey vessel 10, signal sources 32, streamers 20, sensors 22, etc. As illustrated in FIG. 1, streamers 20 are coupled to survey vessel 10 via cables 18.

Collectively, the survey data that is recorded by recording system 12 may be referred to as "marine survey input data." In embodiments where the survey being performed is a seismic survey, the recorded data may be more specifically referred to as "marine survey seismic data," although the marine survey input data may encompass survey data generated by other techniques. In various embodiments, the marine survey input data may not necessarily include every observation captured by sensors 22 (e.g., the raw sensor data may be filtered before it is recorded). Also, in some embodiments, the marine survey input data may include data that is not necessarily indicative of subsurface geology, but may nevertheless be relevant to the circumstances in which the survey was conducted (e.g., environmental data such as water temperature, water current direction and/or speed, salinity, etc.).

Geodetic position (or "position") of the various elements of system 100 may be determined using various devices, including navigation equipment such as relative acoustic ranging units and/or global navigation satellite systems (e.g., a global positioning system (GPS)).

Each of signal sources 32 may include sub-arrays of multiple individual signal sources. For example, a signal source 32 may include a plurality of air guns, marine vibrators, or electromagnetic signal sources. In various embodiments, a geophysical survey system may include any appropriate number of towed signal sources 32 and streamers 20.

In some embodiments, various items of information relating to geophysical surveying (e.g., raw data collected by sensors and/or marine survey input data generally, or products derived therefrom by the use of post-collection processing such as the techniques discussed below, to the extent these differ in various embodiments), may be embodied in a "geophysical data product." A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured (or remanufactured) subsequent to survey completion, e.g., during the course of analysis of the survey.

Noise Reduction in Marine Survey Data and Overview of Adaptive Subtraction

As noted above, when collecting marine survey input data of any type, the resultant data may include not only useful information indicative of, e.g., subsurface geology, but also noise that may interfere with useful information. One approach for dealing with such noise involves application of a model or template representative of expected noise to the marine survey input data. For example, prior survey experience in a particular area may lead to an understanding of typical noise phenomena that may tend to occur in that area. These phenomena may then be modeled by a noise template that can be applied to marine survey input data to subtract the modeled noise, ideally improving the signal-to-noise ratio of the resultant data. (For simplicity of exposition, this discussion is primarily grounded in noise reduction of marine seismic survey data, such as seismic data including both primary seismic reflections and multiple seismic reflections. It is noted, however, that the techniques discussed herein are not specifically limited to seismic data or to marine survey data. Rather, these techniques may find applicability in a broad range of signal analysis applications in which noise modeling is employed.)

Regardless of how the noise template is initially generated, it may be possible to further improve its effectiveness by adapting the noise template to more accurately resemble the actual noise present in a given set of marine survey input data. For example, even if a noise phenomenon is understood and modeled in a general way, there may be numerous variations of how that phenomenon might interact with data collected in a particular survey, owing to variability in the exact geometry with which the survey is conducted (e.g., the number of sources and sensors employed, their relative orientation, the orientation of the survey system within the survey environment, etc.), variability in environmental conditions, and/or other possible factors. Specifically adapting a generalized noise template to particular marine survey input data may at least partially account for such variability, thus better fitting the noise template to the actual noise that is encountered. A noise template adapted in this manner may improve noise attenuation in the data to which the template is applied.

One approach for adapting a noise template involves a procedure of least-squares filtering (LSF), in which one or more noise templates are iteratively modified in a manner that attempts to minimize the squared error of an objective function. One example of such an objective function is:

$$e(f_k) = \left\| D(t, x) - \sum_{k=1}^{K} f_k \otimes M_k(t, x) \right\|^2$$

which may be equivalently expressed as:

$$e(f_k) = \left\| P(t, x) + M_T(t, x) - \sum_{k=1}^{K} f_k \otimes M_k(t, x) \right\|^2$$

where D (t, x) denotes seismic input data having both a signal component P (t, x) and a noise component $M_T(t, x)$, where $f_k$ (t) are shaping filters corresponding to the input noise templates $M_k(t, x)$, for k=1, . . . , K (i.e., a total of K noise templates and shaping filters), and where $\otimes$ denotes temporal convolution. (While one-dimensional shaping filters are shown here, in other embodiments, two-dimensional shaping filters $f_k(t, x)$ or higher-order shaping filters may be employed.)

Generally speaking, the LSF procedure attempts to iteratively modify the shaping filters $f_k$ so that the residual squared error (e.g., the residual energy) is minimized. This procedure may iterate until an absolute error threshold is achieve, for a defined number of iterations, or some combination of these or other criteria. Once the LSF procedure is complete, the noise templates $M_k$ (t, x) as adapted by the shaping filters $f_k$ derived from LSF minimization may be subtracted from the seismic input data D(t, x):

$$D_{sub}(t, x) = D(t, x) - \sum_{k=1}^{K} f_k \otimes M_k(t, x)$$

To the extent that the adapted noise templates accurately reflect the true noise component present in the input data, the result, $D_{sub}$ (t, x), represents a reduced-noise record of the input data. Generally speaking, the noise-reduction technique of adapting a set of noise templates (whether through the LSF procedure described here, or another suitable optimization procedure) and then subtracting the resultant noise templates from input data may be generically referred to as "adaptive subtraction." (It is noted that noise template adaptation and adaptive subtraction in general may employ a variety of objective function optimization techniques, with LSF merely being one non-limiting example.)

The effectiveness of the adaptive subtraction procedure just described is predicated upon an assumption, however: that the signal component P (t, x) of input data D (t, x) does not influence the estimation of the adaptive subtraction filters $f_k$. That is, this procedure assumes that the objective function can effectively be formulated as:

$$e(f_k) = \left\| M_T(t, x) - \sum_{k=1}^{K} f_k \otimes M_k(t, x) \right\|^2$$

Equivalently stated, this procedure assumes that the noise component and the signal component of the input data are essentially uncorrelated (i.e., do not overlap in space or time).

As a practical matter, however, this assumption is challenged by many examples of real-world noise phenomena. For example, in marine survey data, signal and noise events may frequently overlap in space and/or time. Even if the noise component does not strictly overlap the signal component, applying the above adaptive subtraction procedure to input data having noise and signal components in proximity to one another (e.g., in space and/or time) may nevertheless produce unwanted artifacts. For example, the process of shaping noise templates to attenuate the noise component may inadvertently attenuate nearby signal components. One example of this consequence is referred to as "primary damage": that is, where the primary signal of interest is attenuated or distorted as a consequence of attempting to remove noise.

Improving Adaptive Subtraction Procedure Through Noise Estimation

As noted above, the effectiveness of an adaptive subtraction procedure in removing a noise component from input data while preserving a signal component may depend on the signal and noise components being uncorrelated. This presents an opportunity to improve the adaptive subtraction procedure by controlling noise filter adaptation based at least in part upon measured correlation between noise and signal components. Broadly speaking, a noise component within input data may be estimated by masking the input data with a filter that represents a degree of correlation between noise and signal components. This masking technique, as described in greater detail below, may enable a better estimation of actual noise within the input data, which in turn may facilitate adapting the noise templates to the noise component itself, rather than adapting the noise templates to the input data that includes possibly-correlated signal and noise components. In other words, attempting to isolate the noise component before performing adaptive subtraction may reduce the effect of correlation between signal and noise components, and may mitigate the unintended consequences of adaptive subtraction that can follow from such correlation. As a result, the techniques described below may yield a greater degree of noise reduction with less signal damage compared to conventional adaptive subtraction techniques, when applied to real-world input data having noise and signal components that overlap or lie in proximity to one another.

Figure 2:
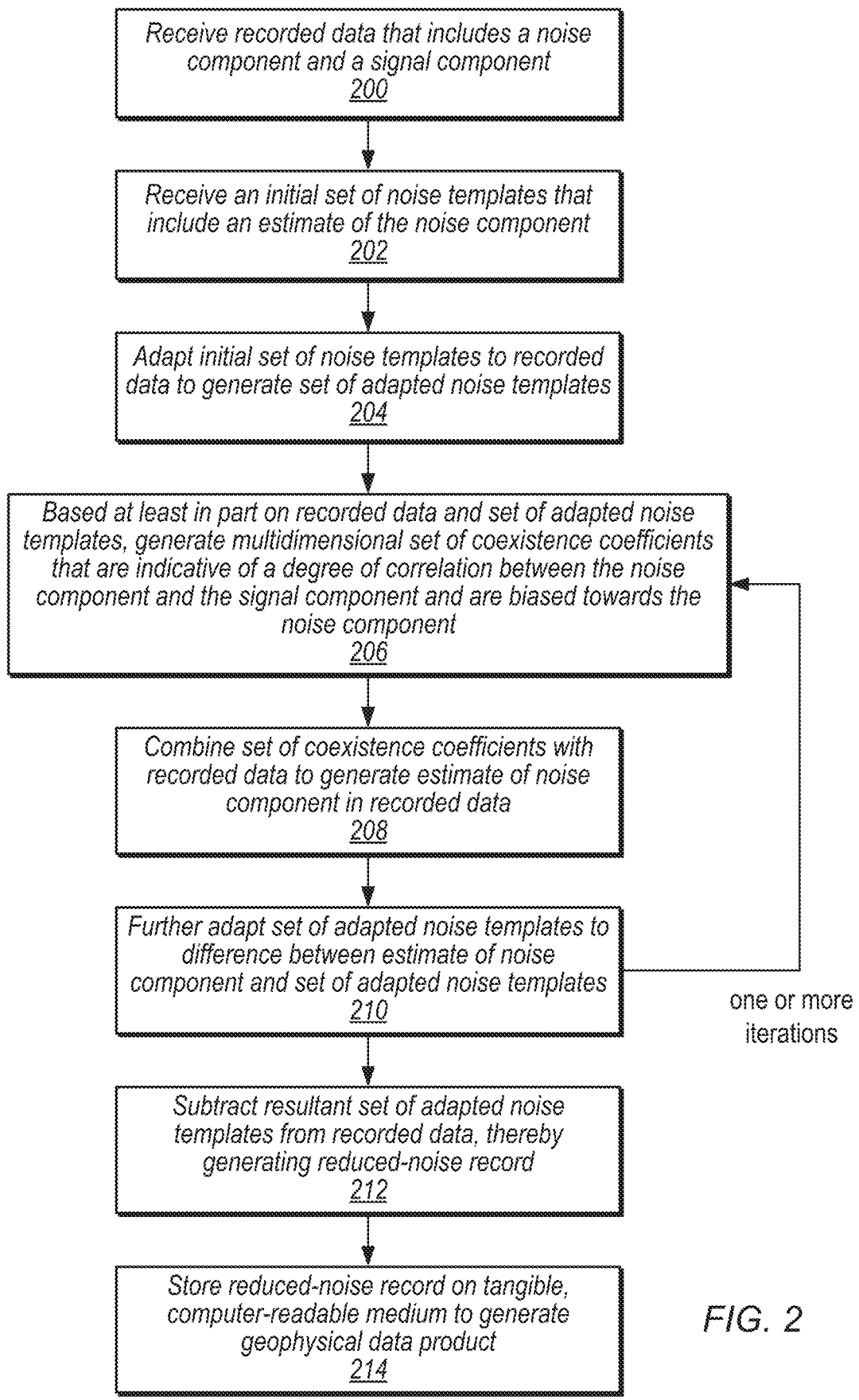
FIG. 2 is a flow diagram illustrating an embodiment of a method of generating a reduced-noise record of recorded data.

FIG. 2 illustrates an embodiment of a method of generating a reduced-noise record of recorded data. Operation begins in block 200 with receiving recorded data that includes a noise component and a signal component. For example, the recorded data could be marine seismic survey data where the signal component of the recorded data corresponds to primary seismic reflections, and where the noise component of the recorded data corresponds to multiple seismic reflections. In other embodiments, however, the recorded data may include geophysical data other than seismic data, or non-geophysical data. In various embodiments, the recorded data may be received from a storage device (e.g., a record of a previously conducted seismic survey or other prior acquisition of data) or may be received directly from sensors during original data acquisition.

In block 202, an initial set of noise templates is received, where the initial set of noise templates include an estimate of the noise component in the recorded data. The initial set of noise templates may include templates that have been previously derived, such as noise models that have been developed from historical data to estimate noise in the region where the recorded data was obtained. Alternatively, the estimate in the initial set of noise templates may be a default value, such as zero (i.e., there may be no nonzero a priori assumptions regarding noise behavior).

In block 204, the initial set of noise templates are adapted to the recorded data to generate a set of adapted noise templates. For example, iterative LSF minimization as described above may be performed on an objective function that is formulated based on input data D(t, x) and initial set of noise templates $M_k^0$ (t, x). As a result, adapted set of noise templates $M_k^1$(t, x) is produced. It is noted that the adaptation that occurs in block 204 adapts the initial set of noise templates to the input data (i.e., the recorded data having both noise and signal components).

As discussed above, the LSF minimization procedure may operate to determine a set of shaping filters $f_k$. In some implementations, the templates output from the LSF procedure may be stored in adapted form by convolving the final shaping filters with the input noise templates and storing the result. Alternatively, the shaping filters may be stored separately and convolved with the input noise templates when the adapted templates are needed.

In block 206, based at least in part on the recorded data and the set of adapted noise templates, a multidimensional set of coexistence coefficients are generated, where the set of coexistence coefficients is indicative of a degree of correlation between the noise component and the signal component, and where the set of coexistence coefficients is biased towards the noise component. More details regarding generation of coexistence coefficients are given below in the discussion of blocks 302-308 of FIG. 3. Broadly speaking, the coexistence coefficients may be generated in a manner that emphasizes portions of the recorded data that are likely to contain noise.

In block 208, the set of coexistence coefficients is combined with the recorded data to generate an estimate of the noise component within the recorded data. For example, as described in greater detail below, the set of coexistence coefficients may be implemented as a set of values C(t, x) between 0 and 1. In an embodiment, values near 0 indicate that noise is very weak or absent, and that the input data is likely to be mostly signal; values near 1 indicate that signal is very weak or absent, and that the input data is likely to be mostly noise. (As discussed in greater detail below, a threshold may be applied to the set of coexistence coefficients prior to combining them with the recorded data.) The noise estimate may then be generated by simply multiplying the recorded data by the coexistence coefficients:

$$E(t,x) = D(t,x) * C(t,x)$$

In block 210, the set of adapted noise templates are further adapted to a difference between the estimate of the noise component and the set of adapted noise templates, thereby producing a resultant set of adapted noise templates. For example, for a given iteration i of the procedure of FIG. 2, the difference may be generated as:

$$Diff_k(t, x) = E(t, x) - \sum_{k=1}^{K} M_k^{i-1}(t, x)$$

(In this example, if there are multiple members of the set of adapted noise templates, they may be summed or combined using another operator before the difference is taken.) The resultant difference $Di f f_k(t, x)$ may then be combined with the adapted noise templates $M_k^{i-1}(t, x)$ to form an objective function for LSF minimization. A LSF procedure may then be performed to iteratively attempt to minimize a sum of squared residuals between the set of adapted noise templates and the difference $Di f f_k(t, x)$, the result of which is the resultant set of adapted noise templates $M_k^i (t, x)$. It is noted that whereas the adaptation that occurs in block 204 adapts the initial set of noise templates to the input data, the adaptation that occurs in block 210 adapts noise templates to the difference between the noise templates and the estimated noise. That is, the adaptation at block 210 is, in general, more influenced by noise than signal.

One or more iterations of blocks 206-210 may be performed before proceeding. In some embodiments, the particular number of iterations is statically determined. For example, the number of iterations may be predetermined based on experience or experimentation with a particular data set; in a marine seismic context, experimentation has shown that satisfactory denoising can be achieved with 4-6 iterations. In other embodiments, the number of iterations may be dynamically determined based at least in part on a degree of adaptation of the set of adapted noise templates. For example, a measure of the difference between successive iterations of noise templates $M_k^{i-1}(t, x)$ and $M_k^i (t, x)$ may be generated and tested to see if it satisfies a threshold or termination criterion, such that iteration may terminate when further adaptation of the noise templates yields diminishing progress. Other techniques for dynamically determining the number of iterations of blocks 206-210 are possible and contemplated.

In block 212, the resultant set of adapted noise templates are subtracted from the recorded data, thereby generating a reduced-noise record of the recorded data. It is noted that "subtraction" need not entail literal arithmetic subtraction, but rather refers to any suitable combination of the resultant set of adapted noise templates with the recorded data that causes the representation of noise modeled by the resultant set of adapted noise templates to be canceled or otherwise removed from the recorded data.

Lastly, in block 214, the reduced-noise record is stored on a tangible, computer-readable medium, thereby completing the manufacturing of a geophysical data product. It is noted that in other embodiments, additional or alternative operations may be performed before a record is stored to generate a geophysical data product.

Figure 3:
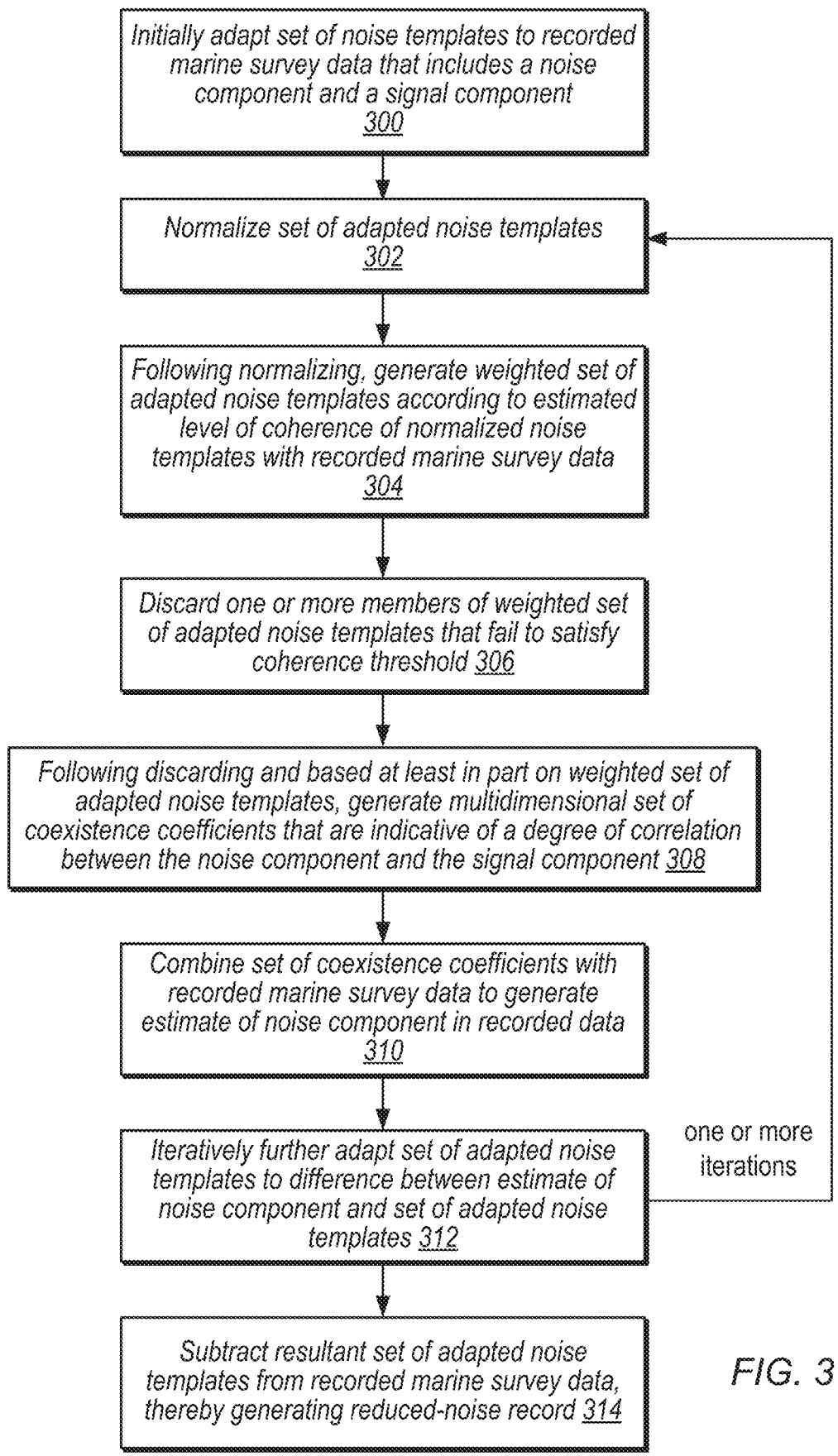
FIG. 3 is a flow diagram illustrating another embodiment of generating a reduced-noise record of recorded data.

FIG. 3 illustrates an embodiment of a method of producing an image of subsurface geological features based on recorded marine survey data, some aspects of which illustrate embodiments of FIG. 2. In FIG. 3, operation begins in block 300 with initially adapting a set of noise templates $M_k$ (t, x) to recorded marine survey data D (t, x) to generate a set of adapted noise templates, where the recorded marine survey data includes a noise component and a signal component. In particular, the adapting includes performing iterative adaptive subtraction to reduce a degree of difference between the set of adapted noise templates and the recorded marine survey data. For example, LSF minimization may be performed to iteratively adapt noise templates to recorded marine survey data in a manner similar to that discussed above, e.g., with respect to block 204 of FIG. 2.

In some embodiments, as noted with respect to FIG. 2, the signal component of the recorded marine survey data may correspond to primary seismic reflections, and the noise component may correspond to multiple seismic reflections. In other embodiments, however, the signal and noise components may correspond to other phenomena.

In block 302, the set of adapted noise templates is normalized. Generally speaking, the normalization may be performed according to a root-mean-squared (RMS) value of the set of adapted noise templates and an RMS value of the recorded marine survey data. Several examples of normalization techniques are discussed in greater detail below in conjunction with the descriptions of FIGS. 4 and 5.

In block 304, following the normalizing, a weighted set of adapted noise templates is generated according to an estimated level of coherence of the normalized set of adapted noise templates with the recorded marine survey data. In some embodiments, generating the weighted set of adapted noise templates may be performed by generating a normalized cross-correlation value $X_k$ between individual members of the set of adapted noise templates $M_k$ (t, x) and the recorded data. For a given adapted noise template, the normalized cross-correlation may, in some cases, be performed after first subtracting the arithmetic mean value of the given adapted noise template from the data points of the given adapted noise template, and similarly subtracting the arithmetic mean value of the data points of the recorded marine survey data from the recorded marine survey data. Alternatively, the normalized cross-correlation may be determined without mean-adjusting the data in this manner. The resultant cross-correlation value may be a single scalar value.

Once the normalized cross-correlation value is generated for a given adapted noise template, it may be applied to that noise template to generate a member of the weighted set of adapted noise templates. For example, individual elements of a given adapted noise template may simply be arithmetically multiplied by the normalized cross-correlation value determined for the given adapted noise template.

In block 306, one or more members of the weighted set of adapted noise templates that fail to satisfy a coherence threshold are discarded. In some embodiments, the coherence threshold may be specified as a fraction of the number of noise templates in use. For example, the weighted set of adapted noise templates may be sorted according to their respective normalized cross-correlation values, and the lowest 20-25% of the weighted set of adapted noise templates may be discarded. The particular threshold to be employed may depend on the nature of the data and may be tuned through experimentation. Generally speaking, as the threshold decreases (i.e., fewer noise templates are discarded), the risk of signal damage resulting from denoising may increase. Conversely, as the threshold increases (i.e., more noise templates are discarded), less noise may be removed during denoising. It is noted that a computer system programmed to implement the techniques of block 304, either alone or in combination with block 306, may constitute a means for weighting a normalized set of noise templates according to an estimated level of coherence of the normalized set of noise templates with recorded seismic data, where the recorded seismic data includes a noise component and a signal component.

In block 308, following the discarding and based at least in part on the weighted set of adapted noise templates, a multidimensional set of coexistence coefficients C(t, x) is generated, where the coexistence coefficients are indicative of a degree of correlation between the noise component and the signal component. In some embodiments, to generate the multidimensional set of coexistence coefficients, the weighted set of adapted noise templates may be merged into a single merged noise template $M^{merge}(t, x)$. The merging may be performed, for example, by generating a normalized sum of the weighted set of adapted noise templates:

$$M^{merge}(t, x) = \frac{\sum_{k=1}^{K} X_k M_k}{\sum_{k=1}^{K} X_k}$$

Additionally, in some embodiments, generating the multidimensional set of coexistence coefficients may include applying a smoothing operator. The smoothing operator may be applied to the weighted set of adapted noise templates (either prior to or subsequent to merging into a single merged noise template) and the recorded marine survey data. In various embodiments, the smoothing operator may include applying a median filter or performing a k-nearest neighbor average (e.g., at a given point, computing the average or mean of the k nearest neighboring points along each dimension). In some embodiments, a Hilbert transform may applied to the noise templates and/or recorded marine survey data prior to applying smoothing.

One particular technique for generating the multidimensional set of coexistence coefficients is:

$$C(t, x) = 1 - \frac{1}{\sqrt{1 + \left(\frac{\hat{M}^{merge}(t, x)}{|\hat{D}(t, x) - \hat{M}^{merge}(t, x)| + \alpha}\right)^2}}$$

Here, $\hat{M}^{merge}(t, x)$ and $\hat{D}(t, x)$ denote smoothed versions of the merged noise template and the recorded marine seismic data, respectively, and a denotes a very small positive constant (e.g., on the order of $10^{-9}$ or smaller). The value of C(t, x) will be in the range from 0 to 1; generally speaking, it will be close to 0 when noise is weak or absent, and it will be close to 1 when signal is weak or absent (e.g., in the case that $\hat{M}^{merge}(t, x)$ closely approximates $\hat{D}(t, x)$). The parameter a may serve to keep the function well-behaved by ensuring the existence of a nonzero denominator (i.e., driving the value of the entire expression close to 1 in the event that $\hat{M}^{merge}(t, x)$ and $\hat{D}(t, x)$ were to be equal).

In some embodiments, generating the multidimensional set of coexistence coefficients may include applying a threshold value. For example, as noted above, the value of C(t, x) may include values ranging from 0 to 1. Thresholding may be applied to force coefficients less than the threshold to 0, resulting in thresholded coefficients $C_T(t, x)$. The threshold to be employed may be dependent on the nature of the data and may be subject to tuning, but in testing using marine seismic survey data, a threshold value in the range of 0.25-0.35 produced satisfactory results. Applying a threshold is one example of a manner in which the coexistence coefficients may be biased towards the noise component (e.g., by deemphasizing data points where noise is relatively weak.) Generally speaking, lowering the threshold may tend to increase the likelihood of signal damage, whereas increasing the threshold may tend to reduce the effectiveness of noise reduction. It is noted that a computer system programmed to implement the techniques of block 308 may constitute a means for generating a multidimensional set of coexistence coefficients indicative of a degree of correlation between a noise component and a signal component.

It is noted that collectively, blocks 302-308 correspond to a particular embodiment of a procedure for generating a multidimensional set of coexistence coefficients as shown in block 206 of FIG. 2. Other embodiments are possible and contemplated.

In block 310, the set of coexistence coefficients is combined with the recorded marine survey data to generate an estimate of the noise component within the recorded marine survey data. For example, as discussed above with respect to block 208 of FIG. 2, the recorded marine survey data may simply be multiplied by the coefficients. It is noted that a computer system programmed to implement the techniques of block 310 may constitute a means for estimating a noise component based at least in part on a multidimensional set of coexistence coefficients and recorded seismic data.

In block 312, the set of adapted noise templates are iteratively further adapted to a difference between the estimate of the noise component and the set of adapted noise templates, thereby producing a resultant set of adapted noise templates. In an embodiment, this further adaptation may be performed using an iterative LSF minimization procedure in a manner similar to that described above with respect to block 210 of FIG. 2. As with block 210, it is noted that whereas the initial adaptation that occurs in block 300 adapts the set of noise templates to the recorded marine survey data, the adaptation that occurs in block 312 adapts noise templates to the difference between the noise templates and the estimate of the noise component. It is noted that a computer system programmed to implement the techniques of block 312 may constitute a means for adapting a set of noise templates to a difference between an estimated noise component and the set of noise templates.

It is noted that in various embodiments, multiple iterations of blocks 302-312 may be performed before proceeding. As discussed above with respect to FIG. 2, in various embodiments, the number of iterations may either be statically determined (e.g., a fixed number such as 4-6 iterations) or dynamically determined. Dynamically determined iteration may be based at least in part on a degree of adaptation of the set of adapted noise templates; for example, iteration may terminate when adaptation between successive iterations falls below a threshold level.

In block 314, the resultant set of adapted noise templates is subtracted from the recorded marine survey data, thereby generating a reduced-noise record of the recorded marine survey data. This subtraction may be similar to that discussed above with respect to block 212 of FIG. 2. In some embodiments, the reduced-noise record may be stored on a tangible, computer-readable medium to generate a geophysical data product. Additionally, in some embodiments, the reduced-noise record of the recorded marine survey data may itself be an image of subsurface geological features based on recorded marine survey data, whereas in other embodiment, further analysis may be performed to generate the image of subsurface geological features from the reduce-noise record of recorded marine survey data. It is noted that a computer system programmed to implement the techniques of block 212 or 314 may constitute a means for applying combining an adapted set of noise templates and recorded seismic data to generate denoised seismic data.

Figure 4:
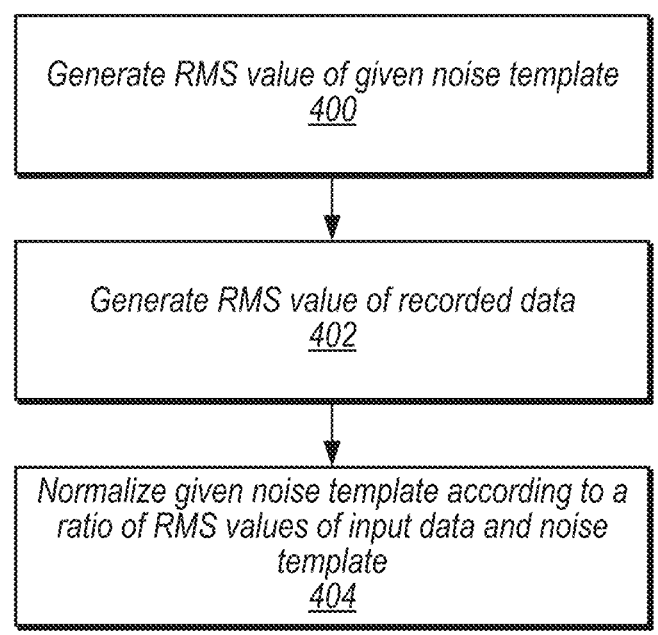
FIG. 4 is a flow diagram illustrating an embodiment of a normalization procedure that may, for example, be used in conjunction with the method of FIG. 3.

FIG. 4 illustrates one embodiment of a normalization procedure that may be used, for example, at block 302 of FIG. 3. As discussed above, one embodiment of normalization of the set of adapted noise templates may be performed according to an RMS value of the set of adapted noise templates and an RMS value of the recorded marine survey data. In particular, the operation of FIG. 4 begins in block 400, where an RMS value of a given noise template is generated. For example, a given noise template $M_k(t, x)$ may be implemented as a multidimensional windowed dataset T(i) having n data points stored in a one-dimensional array (although other storage data structures are also possible). The RMS value of T(i) may be determined as:

$$T_{RMS} = \sqrt{\frac{\sum T(i)^2}{n}}$$

In some embodiments, only the nonzero amplitudes in T(i) may participate in the RMS calculation. In this case, n may reflect the total of nonzero data points.

In block 402, the RMS value of the recorded data is generated. For example, data D(t, x), which includes both a signal and a noise component, may be implemented as a multidimensional windowed dataset IN (i) having m data points stored in a one-dimensional array (although, again, other data structures are possible). The RMS value of IN (i) may be determined as:

$$IN_{RMS} = \sqrt{\frac{\sum IN(i)^2}{m}}$$

As with the noise template, in some embodiments, only the nonzero amplitudes in IN (i) may participate in the RMS calculation. Here, m may correspondingly represent the number of nonzero data points.

In block 404, the given noise template may be normalized according to a ratio of the RMS values of the input data and the noise template. For example, T(i) may be normalized by:

$$T_{NORM}(i) = T(i) \frac{IN_{RMS}}{T_{RMS}}$$

The normalization may be applied to each data point in T(i), effectively scaling all of the data points according to the ratio.

Figure 5:
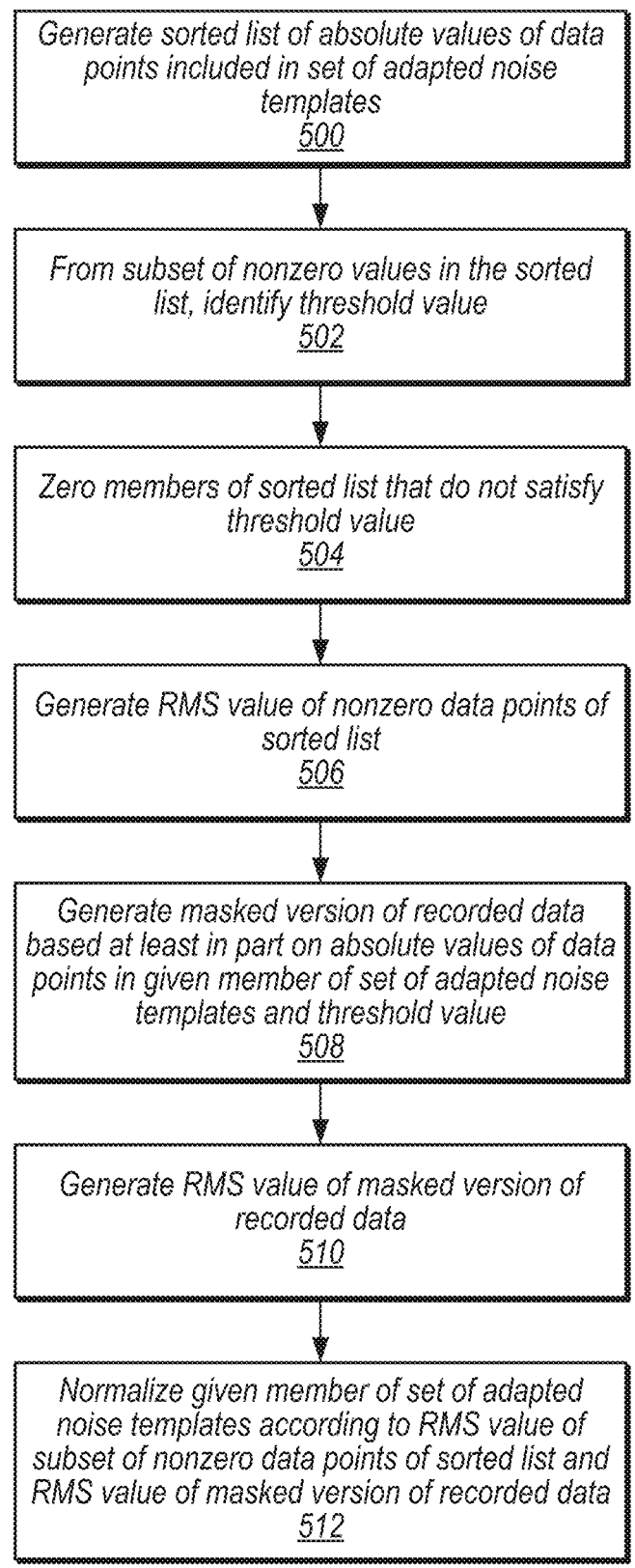
FIG. 5 is a flow diagram illustrating a different embodiment of a normalization procedure that may, for example, be used in conjunction with the method of FIG. 3.

FIG. 5 illustrates another embodiment of a normalization procedure that may be used, for example, at block 302 of FIG. 3. Operation begins in block 500 with generation of a sorted list of absolute values of data points included in a given member of the set of adapted noise templates. For example, as with FIG. 4, assume that in an embodiment, a given noise template $M_k(t, x)$ may be implemented as a multidimensional windowed dataset T(i) having n data points stored in a one-dimensional array, and similarly assume that data D (t, x) may be implemented as a multidimensional windowed dataset IN (i) having m data points stored in a one-dimensional array. The absolute value of the data points may be taken, and then the data points may be sorted (e.g., in increasing order) to generate sorted list $T_{SORT}(i)$.

At block 502, from a subset of nonzero values in the sorted list $T_{SORT}(i)$, a threshold value is identified. In a particular embodiment, identifying the threshold value includes identifying a position in sorted list $T_{SORT}(i)$ that is located at a predefined percentile of the subset of nonzero values, and selecting a value of sorted list $T_{SORT}(i)$ at that position as the threshold value. For example, suppose the predefined percentile is the $25^{th}$ percentile (although other values may be chosen based on the properties of the data set and/or experimentation) and that sorted list $T_{SORT}(i)$ contains 40 nonzero data points. The position corresponding to this percentile may be determined as the percentile multiplied by the number of nonzero data points; in this example, the relevant position is the $10^{th}$ position of the nonzero values in sorted list $T_{SORT}(i)$. (When the position number determined by the product of the percentile and the number of nonzero data points is not an integer, in various embodiments it may be rounded up or down to an integer value.) The threshold value $T_{threshold}$ is then determined as the value of sorted list $T_{SORT}(i)$ at the identified position.

At block 504, the data points of sorted list $T_{SORT}(i)$ that do not satisfy the threshold value $T_{threshold}$ (e.g., are less than the threshold value) are zeroed. For example, $T_{ZEROED}(i)$ may be generated by zeroing the data points of $T_{SORT}(i)$ that are less than $T_{threshold}$.

At block 506, the RMS value of the nonzero data points of T ZEROED(i) is determined. For example:

$$T_{RMS, SORT} = \sqrt{\frac{\sum T_{ZEROED}(i)^2}{k}}$$

where k denotes the number of nonzero data points in $T_{ZEROED}$ (i).

At block 508, a masked version of the recorded data is generated based at least in part upon the absolute values of data points included in the given member of the set of adapted noise templates and the threshold value. For example, in an embodiment, $T_{MASKED}(i)$ may be generated from T(i) as follows: if a data point of T(i) is less than or equal to T threshold, then the corresponding value of $T_{MASKED}$ (i) is set to 0. Otherwise, the corresponding value of $T_{MASKED}$ (i) is set to 1. Then, the masked recorded data may be determined as the simple arithmetic product of the recorded data and the mask:

$$IN_{MASKED}(i) = IN(i) * T_{MASKED}(i)$$

At block 510, the RMS value of the nonzero data points of the masked version of the recorded data is determined. For example, the RMS value may be given as:

$$IN_{RMS, MASKED} = \sqrt{\frac{\sum IN_{MASKED}(i)^2}{k}}$$

where k denotes the number of nonzero data points in $IN_{MASKED}$ (i).

At block 512, the given member of the set of adapted noise templates is normalized according to the RMS value of the subset of nonzero data points of the sorted list and the RMS value of the masked version of the recorded data. For example, T(i) may be normalized by:

$$T_{NORM}(i) = T(i) \frac{IN_{RMS,MASKED}}{T_{RMS,SORT}}$$

The normalization may be applied to each data point in T(i), effectively scaling all of the data points according to the ratio.

As can be seen from the foregoing discussion, the normalization procedure of FIG. 5 does not utilize all data values of a given noise template. Instead, through the process of sorting and determining a threshold value based on a predefined percentage, the procedure excludes those data points of the noise template that are comparatively weak, and similarly excludes data points of the input data that correspond to excluded data points of the noise template. In at least some cases, this procedure may more reliably isolate noise energy than the normalization procedure of FIG. 4. It is noted that a computer system programmed to implement the techniques of either FIG. 4 or FIG. 5 may constitute a means for generating a normalized set of noise templates based on a set of noise templates.

Figure 6:
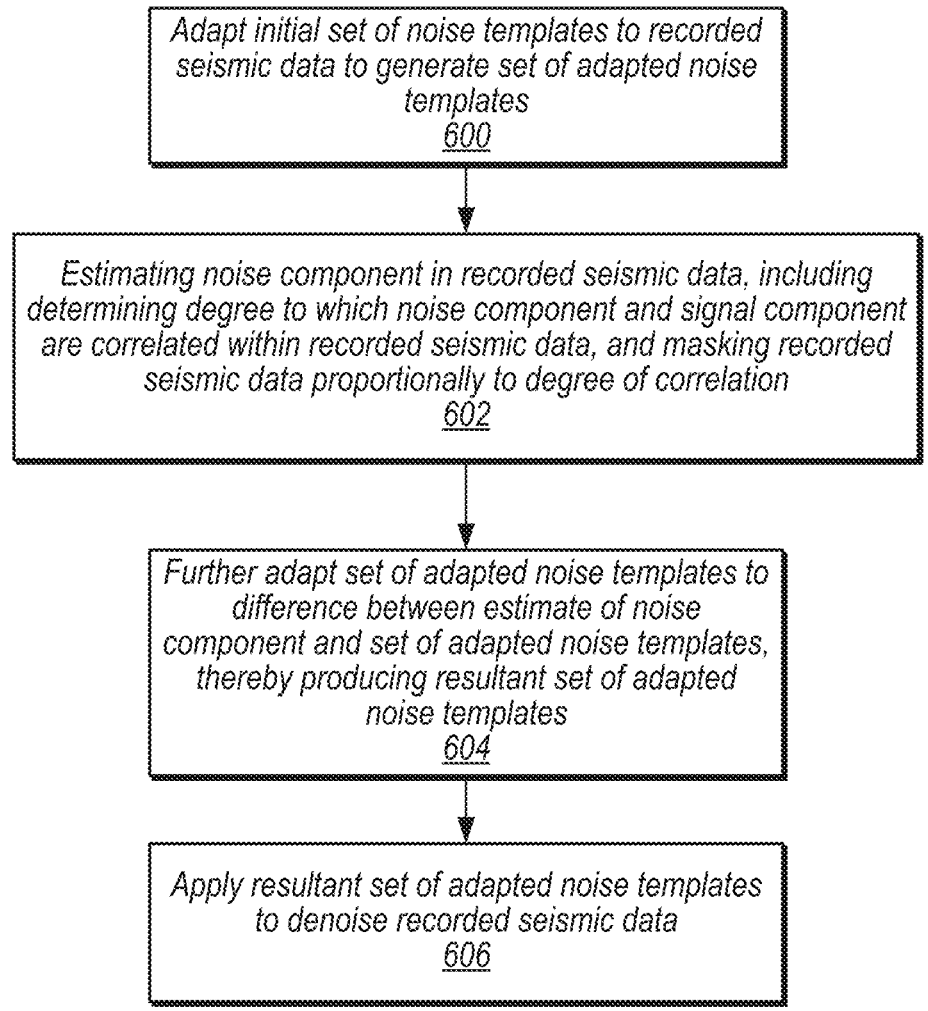
FIG. 6 is a flow diagram illustrating an embodiment of a method of denoising recorded seismic data.

FIG. 6 illustrates an embodiment of a method of denoising recorded seismic data that includes a noise component and a signal component. Operation begins in block 600 with adapting an initial set of noise templates to the recorded seismic data to generate a set of adapted noise templates. For example, as described above with respect to FIGS. 2 and 3, noise templates may initially be adapted to recorded data using an LSF minimization process or another suitable process.

In block 602, the noise component in the recorded seismic data is estimated based on the set of adapted noise templates and the recorded seismic data. In an embodiment, the estimating includes determining a degree to which the noise component and the signal component are correlated within the recorded seismic data, and masking the recorded seismic data proportionally to the degree of correlation to generate an estimate of the noise component. For example, determining the degree of correlation may include generating a normalized cross-correlation between the set of adapted noise templates and the recorded seismic data, and may also include discarding member(s) of the set of adapted noise templates that fail to satisfy a threshold degree of correlation. It may further include generating thresholded coexistence coefficients $C_T(t, x)$ and then using these coefficients to mask recorded data D (t, x) (e.g., by zeroing the estimate of the noise component at coordinates where the degree of correlation is below a threshold value) as described above with respect to blocks 302-310 of FIG. 3. It is noted, however, that variations of the technique of FIG. 3 may be employed that perform additional and/or different operations, possibly in a different order than illustrated, or that perform noise component estimation using entirely different techniques.

In block 604, the set of adapted noise templates is further adapted to a difference between the estimate of the noise component and the set of adapted noise templates, thereby producing a resultant set of adapted noise templates. For example, the techniques described above with respect to blocks 210 and/or 312 of FIGS. 2 and 3, or suitable variations thereof, may be employed to further adapt the set of adapted noise templates.

In block 606, the resultant set of adapted noise templates is applied to denoise the recorded seismic data. For example, the resultant set of templates may be subtracted or otherwise combined with the recorded seismic data as described above.

Figure 7:
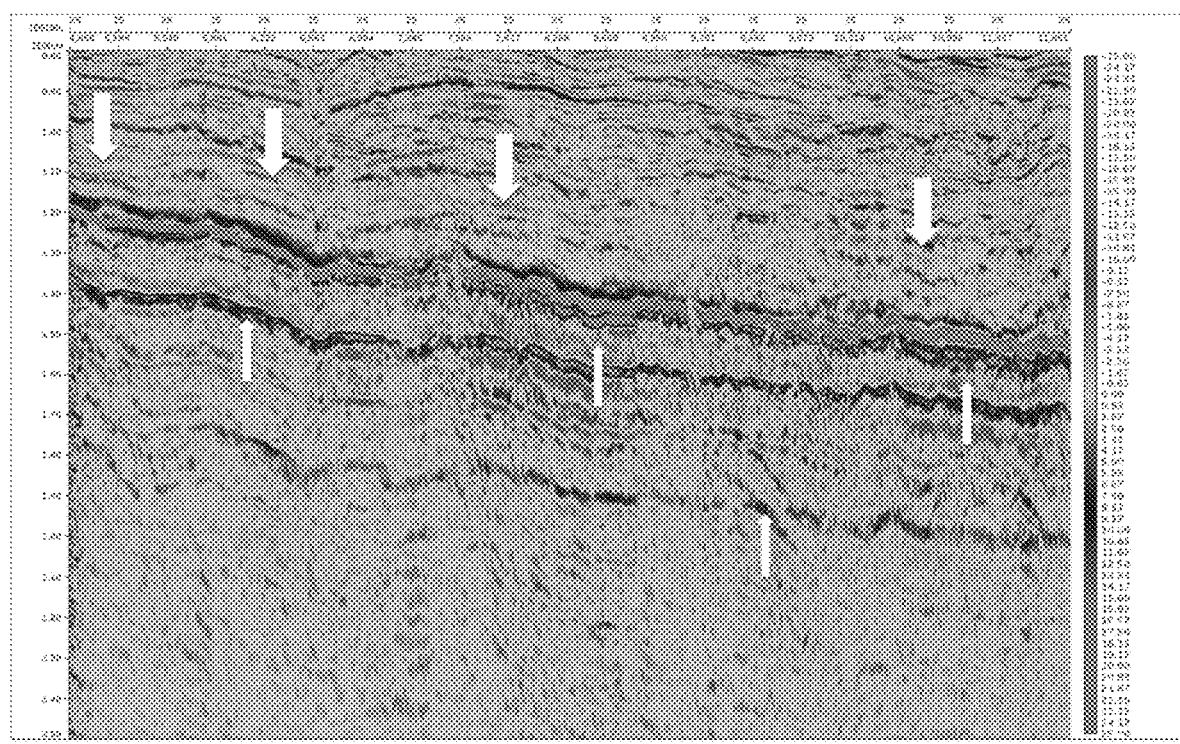
FIG. 7 illustrates an example visualization of recorded seismic data prior to noise reduction.
Figure 8:
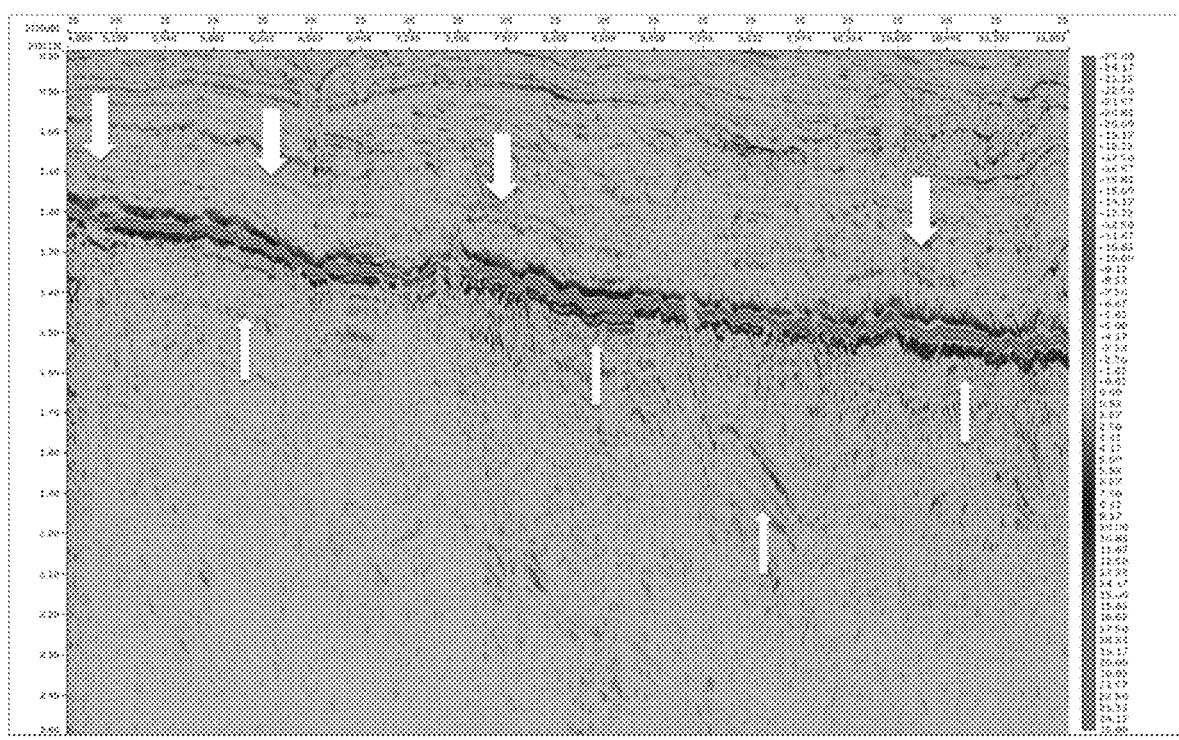
FIG. 8 illustrates an example visualization of the data of FIG. 7 after denoising using a conventional adaptive subtraction technique.
Figure 9:
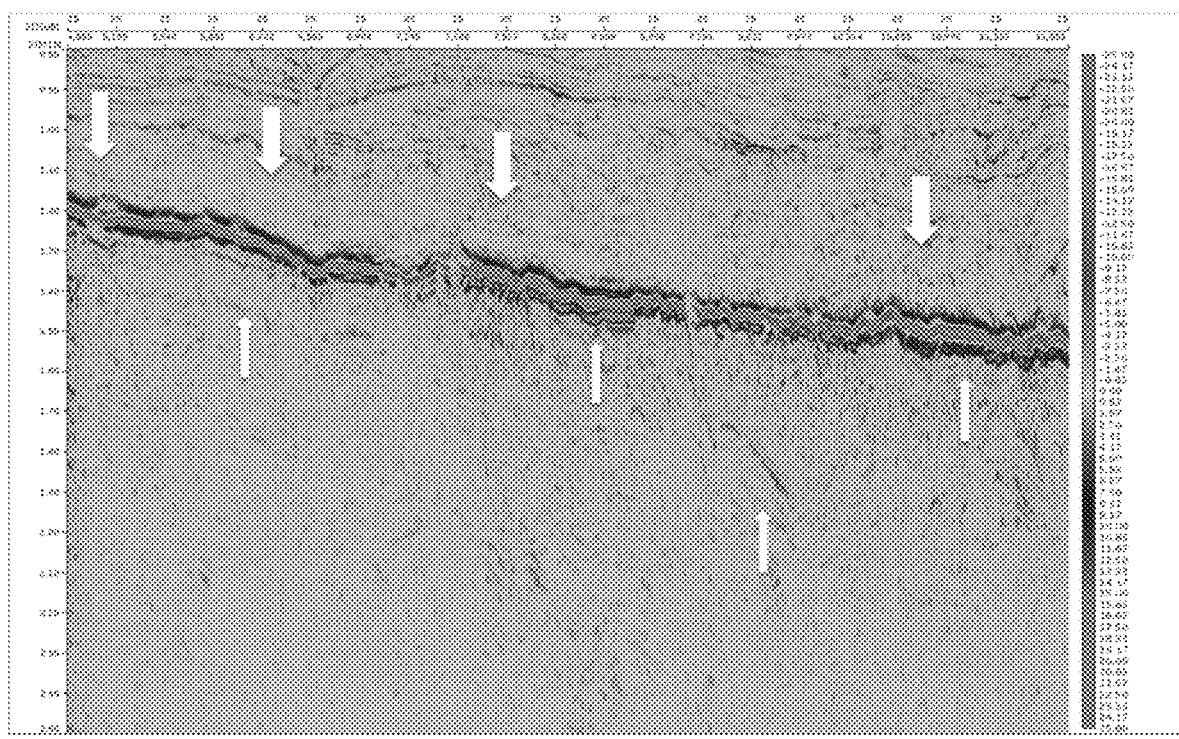
FIG. 9 illustrates an example visualization of the data of FIG. 7 after denoising using the techniques described in this disclosure.

FIGS. 7-9 illustrate processing examples of actual seismic data. In particular, FIG. 7 illustrates recorded seismic data prior to any adaptive-subtraction-based denoising. FIG. 8 shows the same data processed using a conventional adaptive subtraction technique. FIG. 9 shows the same data processed using the techniques described in this disclosure. The arrows common to all three illustrations show locations of noise features. As can be seen from the illustrations, while the conventional technique reduces a substantial amount of noise, the techniques discussed here improve noise reduction still further over the conventional technique.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 10:
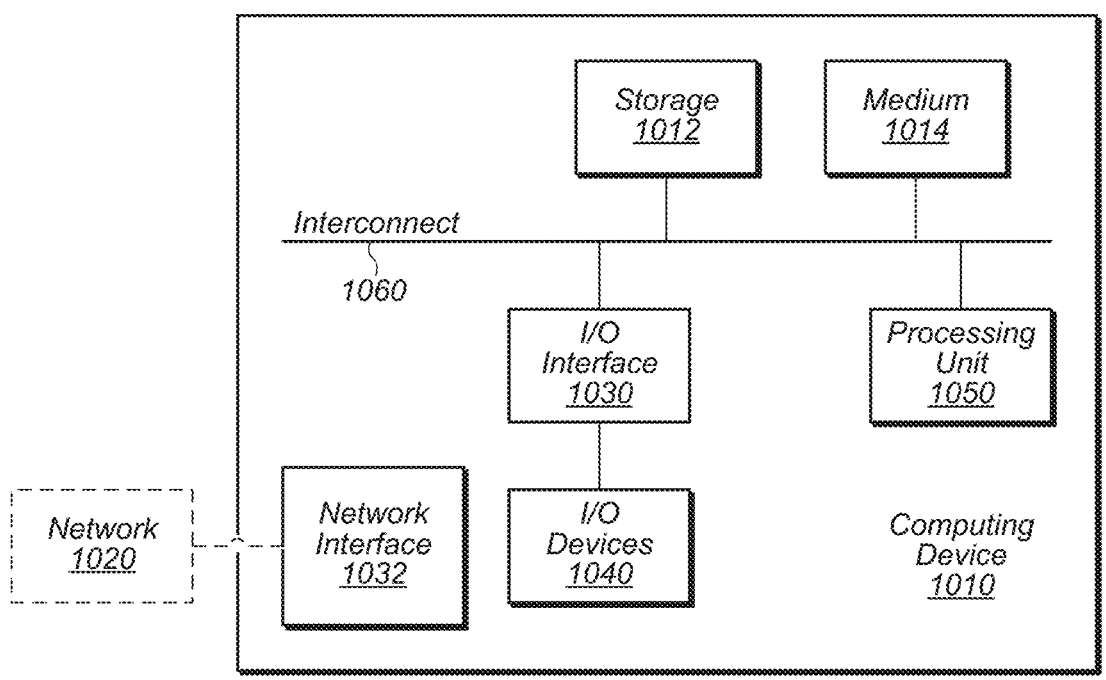
FIG. 10 shows a block diagram illustrating an example computing system.

Turning now to FIG. 10, a block diagram of a computing device (which may also be referred to as a computing system) 1010 is depicted, according to some embodiments. Computing device 1010 may be used to implement various portions of this disclosure. Computing device 1010 is one example of a device that may be used as a mobile device, a server computing system, a client computing system, or any other computing system implementing portions of this disclosure. It is noted that in various configurations, computing system 1010, when programmed to perform a specific algorithm, may constitute a means for performing a function for which the specific algorithm is a corresponding structure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

As described above, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein. In at least some embodiments, storage subsystem 1012 may represent an example of a non-transitory computer-readable medium that may store executable instructions.

In the illustrated embodiment, computing device 1010 further includes non-transitory medium 1014 as a possibly distinct element from storage subsystem 1012. For example, non-transitory medium 1014 may include persistent, tangible storage such as disk, nonvolatile memory, tape, optical media, holographic media, or other suitable types of storage. In some embodiments, non-transitory medium 1014 may be employed to store and transfer geophysical data, and may be physically separable from computing device 1010 to facilitate transport. Accordingly, in some embodiments, the geophysical data product discussed above may be embodied in non-transitory medium 1014. Although shown to be distinct from storage subsystem 1012, in some embodiments, non-transitory medium 1014 may be integrated within storage subsystem 1012. Embodiments of non-transitory medium 1014 and/or storage subsystem 1012 may correspond to a means for storing recorded seismic data.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1040.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Only those claims expressly using the "means for [performing a function]" construct are intended to invoke Section 112(f) for that claim element.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A non-transitory machine-readable medium that stores instructions, wherein the instructions are executable by one or more processors to perform operations comprising:
   receiving recorded data, wherein the recorded data includes a noise component and a signal component;
   receiving an initial set of noise templates that include an estimate of the noise component;
   adapting the initial set of noise templates to the recorded data to generate a set of adapted noise templates;
   performing one or more iterations of:
      based at least in part on the recorded data and the set of adapted noise templates, generating a multidimensional set of coexistence coefficients indicative of a degree of correlation between the noise component and the signal component, wherein the set of coexistence coefficients is biased towards the noise component;
      combining the set of coexistence coefficients with the recorded data to generate an estimate of the noise component within the recorded data;
      further adapting the set of adapted noise templates to a difference between the estimate of the noise component and the set of adapted noise templates, thereby producing a resultant set of adapted noise templates;
   subtracting the resultant set of adapted noise templates from the recorded data, thereby generating a reduced-noise record of the recorded data; and
   storing the reduced-noise record of the recorded data on a tangible, computer-readable medium.

2. The non-transitory machine-readable medium of claim 1, wherein the signal component of the recorded data corresponds to primary seismic reflections, and wherein the noise component of the recorded data corresponds to multiple seismic reflections.

3. The non-transitory machine-readable medium of claim 1, wherein generating the multidimensional set of coexistence coefficients includes normalizing the set of adapted noise templates according to a root-mean-square (RMS) value of the set of adapted noise templates and an RMS value of the recorded data.

4. The non-transitory machine-readable medium of claim 1, wherein generating the multidimensional set of coexistence coefficients includes:
   generating a sorted list of absolute values of data points included in a given member of the set of adapted noise templates;
   from a subset of nonzero values in the sorted list, identifying a threshold value;
   generating a masked version of the recorded data based at least in part upon the absolute values of data points included in the given member of the set of adapted noise templates and the threshold value; and
   normalizing the given member of set of adapted noise templates according to an RMS value of the subset of nonzero data points of the sorted list and an RMS value of the masked version of the recorded data.

5. The non-transitory machine-readable medium of claim 4, wherein identifying the threshold value includes identifying a position in the sorted list located at a predefined percentile of the subset of nonzero values and selecting a value of the sorted list at the position as the threshold value.

6. The non-transitory machine-readable medium of claim 1, wherein generating the multidimensional set of coexistence coefficients includes generating a weighted set of adapted noise templates according to an estimated level of coherence of the set of adapted noise templates with the recorded data.

7. The non-transitory machine-readable medium of claim 6, wherein generating the weighted set of adapted noise templates according to the estimated level of coherence with the recorded data includes generating a normalized cross-correlation between members of the set of adapted noise templates and the recorded data.

8. The non-transitory machine-readable medium of claim 6, wherein generating the multidimensional set of coexistence coefficients further includes discarding one or more members of the weighted set of adapted noise templates that fail to satisfy a coherence threshold.

9. The non-transitory machine-readable medium of claim 6, wherein generating the multidimensional set of coexistence coefficients further includes merging the weighted set of adapted noise templates into a single merged noise template.

10. The non-transitory machine-readable medium of claim 6, wherein generating the multidimensional set of coexistence coefficients further includes applying a smoothing operator to the weighted set of adapted noise templates and the recorded data.

11. The non-transitory machine-readable medium of claim 10, wherein the smoothing operator includes one or more of: a median filter or a k-nearest neighbor average.

12. The non-transitory machine-readable medium of claim 1, wherein further adapting the set of adapted noise templates to the difference between the estimate of the noise component and the set of adapted noise templates includes performing a least squares fitting process that iteratively attempts to minimize a sum of squared residuals between the set of adapted noise templates and the difference.

13. The non-transitory machine-readable medium of claim 1, wherein a number of the one or more iterations is statically determined.

14. The non-transitory machine-readable medium of claim 1, wherein a number of the one or more iterations is dynamically determined based at least in part on a degree of adaptation of the set of adapted noise templates.

15. In a technological process for producing an image of subsurface geological features based on recorded marine survey data, wherein the process includes initially adapting a set of noise templates to recorded marine survey data to generate an set of adapted noise templates, where the initially adapting includes performing iterative adaptive subtraction to reduce a degree of difference between the set of adapted noise templates and the recorded marine survey data, where the recorded marine survey data includes a noise component and a signal component, the specific improvement comprising:

normalizing the set of adapted noise templates;

following the normalizing, generating a weighted set of adapted noise templates according to an estimated level of coherence of the normalized set of adapted noise templates with the recorded marine survey data;

discarding one or more members of the weighted set of adapted noise templates that fail to satisfy a coherence threshold;

following the discarding and based at least in part on the weighted set of adapted noise templates, generating a multidimensional set of coexistence coefficients indicative of a degree of correlation between the noise component and the signal component;

combining the set of coexistence coefficients with the recorded marine survey data to generate an estimate of the noise component within the recorded marine survey data;

iteratively further adapting the set of adapted noise templates to a difference between the estimate of the noise component and the set of adapted noise templates, thereby producing a resultant set of adapted noise templates; and subtracting the resultant set of adapted noise templates from the recorded marine survey data, thereby generating a reduced-noise record of the recorded marine survey data.

16. The technological process of claim 15, wherein the signal component of the recorded marine survey data corresponds to primary seismic reflections, and wherein the noise component of the recorded marine survey data corresponds to multiple seismic reflections.

17. The technological process of claim 15, wherein normalizing the set of adapted noise templates is performed according to a root-mean-square (RMS) value of the set of adapted noise templates and an RMS value of the recorded marine survey data.

18. The technological process of claim 15, wherein normalizing a given member of the set of adapted noise templates includes:

generating a sorted list of absolute values of data points included in the given member of the set of adapted noise templates;

from a subset of nonzero values in the sorted list, identifying a position in the sorted list located at a predefined percentile of the subset of nonzero values and selecting a value of the sorted list at the position as a threshold value;

generating a masked version of the recorded marine survey data based at least in part upon the absolute values of data points included in the given member of the set of adapted noise templates and the threshold value; and normalizing the given member of the set of adapted noise templates according to an RMS value of the subset of nonzero data points of the sorted list and an RMS value of the masked version of the recorded marine survey data.

19. The technological process of claim 15, wherein prior to generating the multidimensional set of coexistence coefficients, the improvement further comprises performing one or more of:

merging the weighted set of adapted noise templates into a single merged noise template;

applying a smoothing operator to the weighted set of adapted noise templates and the recorded marine survey data.

20. The technological process of claim 15, wherein further adapting the set of adapted noise templates to the difference between the estimate of the noise component and the set of adapted noise templates includes performing a least squares fitting process that iteratively attempts to minimize a sum of squared residuals between the set of adapted noise templates and the difference.

21. The technological process of claim 15, further comprising performing multiple iterations of the improvement prior to subtracting the resultant set of adapted noise templates from the recorded marine survey data, wherein a number of the multiple iterations is either statically determined or dynamically determined based at least in part on a degree of adaptation of the set of adapted noise templates.

22. A system, comprising:
a memory that stores instructions; and
one or more processors configured to execute the instructions to perform operations that implement denoising of recorded seismic data including a noise component and a signal component, the operations including:
adapting an initial set of noise templates to the recorded seismic data to generate a set of adapted noise templates;
estimating the noise component in the recorded seismic data based on the set of adapted noise templates and the recorded seismic data, wherein the estimating includes:
determining a degree to which the noise component and the signal component are correlated within the recorded seismic data; and
masking the recorded seismic data proportionally to the degree of correlation to generate an estimate of the noise component;
further adapting the set of adapted noise templates to a difference between the estimate of the noise component and the set of adapted noise templates, thereby producing a resultant set of adapted noise templates; and
applying the resultant set of adapted noise templates to denoise the recorded seismic data.

23. The system of claim 22, wherein determining the degree to which the noise component and the signal component are correlated includes generating a normalized cross-correlation between the set of adapted noise templates and the recorded seismic data.

24. The system of claim 23, wherein estimating the noise component includes discarding one or more members of the set of adapted noise templates that fail to satisfy a threshold degree of correlation.

25. The system of claim 22, wherein masking the recorded data to generate the estimate of the noise component includes zeroing the estimate of the noise component at coordinates where the degree of correlation is below a threshold value.

* * * * *